United States Patent
Meyer-Ebeling

(10) Patent No.: US 8,951,060 B2
(45) Date of Patent: Feb. 10, 2015

(54) CHARGING COUPLING AND CHARGING COUPLING ARRANGEMENT FOR A MOTOR VEHICLE, AND MOTOR VEHICLE

(75) Inventor: Joerg Meyer-Ebeling, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 260 days.

(21) Appl. No.: 13/546,471

(22) Filed: Jul. 11, 2012

(65) Prior Publication Data

US 2013/0023141 A1   Jan. 24, 2013

(30) Foreign Application Priority Data

Jul. 22, 2011   (DE) .......................... 10 2011 052 078

(51) Int. Cl.
*H01R 13/625* (2006.01)
*H01R 13/447* (2006.01)
*H01R 13/639* (2006.01)
*B60L 11/18* (2006.01)

(52) U.S. Cl.
CPC .......... *H01R 13/639* (2013.01); *B60L 11/1818* (2013.01); *B60L 2270/32* (2013.01); *B60L 2270/34* (2013.01); *Y02T 10/7088* (2013.01); *Y02T 10/7005* (2013.01); *Y02T 90/121* (2013.01); *Y02T 90/14* (2013.01)
USPC ............................ 439/347; 439/148; 320/109

(58) Field of Classification Search
CPC ....................................................... Y02T 90/14
USPC .................. 439/347, 142, 144, 148; 320/109
See application file for complete search history.

(56) References Cited

U.S. PATENT DOCUMENTS

| | | | | |
|---|---|---|---|---|
| 1,366,246 | A * | 1/1921 | Cooper | 439/142 |
| 2,452,922 | A * | 11/1948 | Gonsett et al. | 174/67 |
| 3,182,280 | A * | 5/1965 | Daut et al. | 439/378 |
| 3,270,267 | A * | 8/1966 | Nolte, Jr. | 320/138 |
| 5,458,496 | A * | 10/1995 | Itou et al. | 439/34 |
| 5,580,258 | A * | 12/1996 | Wakata | 439/142 |
| 5,584,715 | A * | 12/1996 | Ehrenfels | 439/222 |
| 5,711,558 | A * | 1/1998 | Woody | 292/335 |
| 5,865,640 | A * | 2/1999 | Tadokoro | 439/347 |
| 5,934,918 | A * | 8/1999 | Wuechner | 439/133 |
| 6,943,527 | B2 * | 9/2005 | Liu et al. | 320/107 |
| 7,364,452 | B2 * | 4/2008 | Carver et al. | 439/310 |
| 7,950,943 | B2 * | 5/2011 | Ohtomo | 439/299 |

(Continued)

FOREIGN PATENT DOCUMENTS

| | | |
|---|---|---|
| DE | 42 12 207 | 10/1993 |
| DE | 10 2007 002 025 | 7/2008 |

(Continued)

*Primary Examiner* — Neil Abrams
(74) *Attorney, Agent, or Firm* — Gerald E. Hespos; Michael J. Porco; Matthew T. Hespos

(57) ABSTRACT

A charging coupling (1) for a motor vehicle (2) has a receiving device (3) with a receiving section (4) for receiving a charging plug (7) and a locking device (11) having a locking section (13) that can be displaced into the receiving section (4) approximately perpendicularly with respect to an introduction direction (E) of the charging plug (7) into the receiving section (4) for locking the charging plug (7) in the receiving device (3) in a charging position. A cover (16) having a sealing device (21) is provided for closing the receiving section (4) in a dust-tight and water-tight manner when the charging plug (7) is removed from the receiving section (4).

8 Claims, 3 Drawing Sheets

(56) References Cited

U.S. PATENT DOCUMENTS

| | | | |
|---|---|---|---|
| 7,988,453 B2 * | 8/2011 | Loo et al. | 439/34 |
| 8,113,849 B2 * | 2/2012 | Park, IV | 439/34 |
| 8,172,599 B2 * | 5/2012 | Konchan | 439/352 |
| 8,262,402 B2 * | 9/2012 | Gaul et al. | 439/304 |
| 8,454,375 B2 * | 6/2013 | Bauer | 439/135 |
| 8,460,028 B2 * | 6/2013 | Tormey et al. | 439/528 |
| 8,550,833 B2 * | 10/2013 | Martin | 439/310 |
| 8,690,591 B2 * | 4/2014 | Charnesky et al. | 439/153 |
| 2012/0071017 A1 * | 3/2012 | Gaul et al. | 439/304 |
| 2012/0135634 A1 * | 5/2012 | Gaul et al. | 439/488 |

FOREIGN PATENT DOCUMENTS

| | | |
|---|---|---|
| DE | 10 2009 021 720 | 11/2009 |
| JP | 11-332024 | 11/1999 |
| WO | 2010/143040 | 12/2010 |

\* cited by examiner

CHARGING COUPLING AND CHARGING COUPLING ARRANGEMENT FOR A MOTOR VEHICLE, AND MOTOR VEHICLE

CROSS REFERENCE TO RELATED APPLICATION

This application claims priority under 35 USC 119 to German Patent Appl. No. 10 2011 052 078.3 filed on Jul. 22, 2011, the entire disclosure of which is incorporated herein by reference.

BACKGROUND OF THE INVENTION

1. Field of the Invention

The invention relates to a charging coupling and to a charging coupling arrangement for a motor vehicle that is operated at least partially electrically, and to a motor vehicle that is operated at least partially electrically, having a charging coupling of this type or having a charging coupling arrangement of this type.

2. Description of the Related Art

Plug-in hybrid vehicles have an energy store that can be charged via an external power network, for example, in addition to recuperation operation. To this end, the vehicle must have a charging coupling, such as a charging socket that can be connected to an external charging cable.

WO 2010/143040 A1 proposes a charging socket of this type concealed by a flap under the body of the motor vehicle and also having a hinged cover to protect against dust and water.

JP 11332024 A describes a charging socket with a cover that has complex kinematics to engage around the charging plug and to fix the charging plug in the charging socket.

U.S. Pat. No. 5,458,496 describes a charging socket that enables a charging plug to be fixed in a middle position on the motor vehicle so that the charging plug cannot fall out of the charging socket. The charging plug is pressed into the middle position by a spring device and is held there by the charging socket if the charging plug has not been plugged completely into the charging socket.

The prior art charging sockets either do not fix the charging plug in the charging position or require a complicated and expensive fixing device for fixing the charging plug.

It is an object of the invention to provide an improved charging coupling.

SUMMARY OF THE INVENTION

The invention relates to a charging coupling for a motor vehicle that is operated at least partially electrically. The charging coupling has a receiving device with a receiving section for receiving a charging plug. The charging coupling also has a locking device with a locking section that can be displaced into the receiving section approximately perpendicularly to an introduction direction of the charging plug into the receiving section, so that the charging plug can be locked in the receiving device in a charging position. As a result, the locking section reliably locks the charging plug in the charging position and prevents unauthorized and/or incorrect removal from the receiving section.

The receiving section preferably cylindrical and hence can be produced simply and inexpensively, thereby reducing the production costs for the charging coupling.

The locking section preferably is displaced into the receiving section in a direction approximately perpendicular to a center axis of said receiving section. Thus, the locking section achieves a very effective locking of the charging plug in the receiving section and prevents the charging plug from being pulled off unintentionally.

The locking section preferably can be displaced into a correspondingly formed mating locking section of the charging plug to achieve positively locked fixing of the charging plug in the receiving section in the charging position of the charging plug. As a result, the charging plug cannot be pulled incorrectly out of the receiving section.

The locking section preferably can be displaced into the mating locking section of the charging plug only when the charging plug is positioned in the receiving section in the charging position. As a result, the charging plug is locked reliably only in the desired charging position to increase operating comfort for a user.

An end face of the charging plug and an end face of the receiving section preferably are arranged in mutual contact when the charging plug is in the charging position of the charging plug. As a result, the correct position of the charging plug in the charging position can be detected particularly simply by the user.

The charging coupling preferably has a cover for closing the receiving section to ensure a dirt-tight and/or water-tight sealing of the receiving section.

The cover preferably can be positioned at least partially in the receiving section of the receiving device. As a result, an additional positioning device for positioning the cover can be omitted, and the number of components of the charging coupling is reduced.

The locking section of the locking device preferably can be displaced into the receiving section in such a way that the cover can be locked in the receiving device. This achieves a dual function of the locking device, since the locking device is configured both for locking the charging plug and for locking the cover in the receiving device. Thus, no additional locking device is required for the cover, thereby reducing the number of required components of the charging coupling.

The locking section preferably can be displaced into a corresponding mating locking section of the cover to ensure positive locking of the cover in the receiving section and to prevent unauthorized or undesired opening of the cover.

The cover preferably has a sealing device for sealing the receiving section and thereby ensuring water-tightness and tightness against fine-grained dust. As a result, the operational reliability of the charging coupling is increased.

The cover and the sealing device preferably are formed in one piece, thereby reducing the number of components and the costs for producing the charging coupling.

The locking device preferably has a drive device for automatically displacing the locking section if the correct charging position of the charging plug in the receiving section is detected.

The invention will be explained in greater detail using exemplary embodiments with reference to the appended figures.

DETAILED DESCRIPTION OF THE PREFERRED EMBODIMENT

Figure 1:
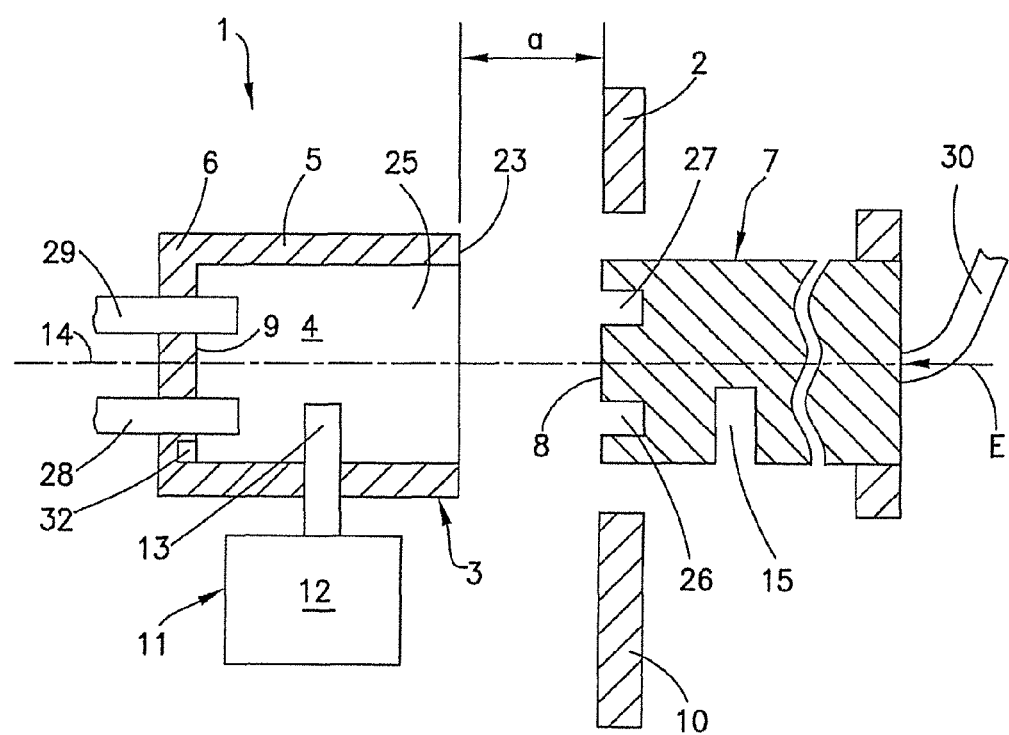
FIG. 1 is a schematic sectional view of one preferred embodiment of a charging coupling in an unconnected state.
Figure 2:
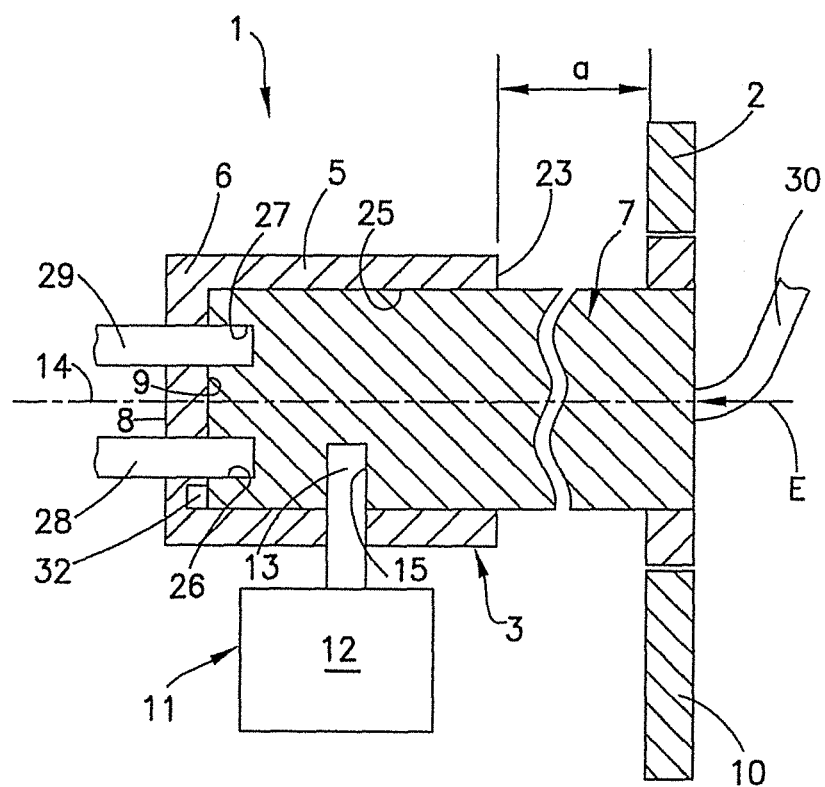
FIG. 2 is a schematic sectional view of the charging coupling according to FIG. 1. in connected state.
Figure 3:
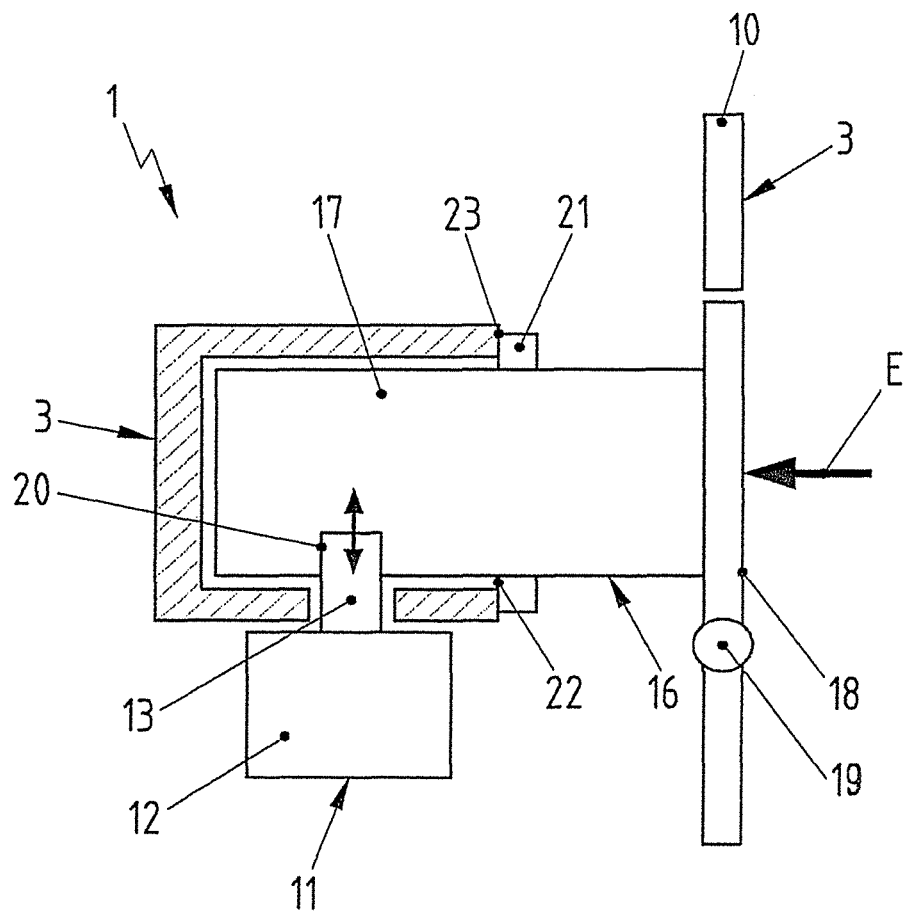
FIG. 3 is a further sectional view of the charging coupling of FIG. 1.

FIGS. 1 to 3 show a charging coupling 1 for a motor vehicle 2. The motor vehicle 2 is configured as a purely electrically operated motor vehicle or as a plug-in hybrid motor vehicle.

The charging coupling 1 has a receiving device 3 that functions as a charging socket of the motor vehicle 2. The receiving device 3 has a hollow receiving section 4 in the form of a cavity defined by a side wall 5, an end wall 6 that is closed at least in sections and an opening 25 that faces away from the end wall 6. The receiving section 4 preferably is cylindrical, but can be block-shaped, and is configured so that a charging plug 7 can be inserted through the opening 25 of the receiving device and into the receiving section 4.

The charging plug 7 is configured complementary to the receiving section 4 of the receiving device 3. In particular, the charging plug 7 has contact elements 26, 27 that can be brought into an electrical operative connection with corresponding mating contact elements 28, 29 of the receiving device 3. The mating contact elements 28, 29 are guided through the end wall 6 of the receiving device 3 and protrude into the receiving section 4. The charging plug 7 is a component of a charging device (not shown) and is connected operatively to the charging device by a charging cable 30. In a charging position (illustrated in FIG. 2) of the charging coupling 1, an electrical contact is produced between the contact elements 26, 27 of the charging plug 7 and the mating contact elements 28, 29 of the receiving device 3 for charging the motor vehicle 2. In the charging position, an end face 8 of the charging plug 7 is in touching contact with an end face 9 of the end wall 6 or of the receiving section 4 of the receiving device 3. The charging coupling 1 can be mounted on a body 10 of the motor vehicle 2. Furthermore, the charging coupling 1 can be mounted on a chassis or any other loadbearing structure of the motor vehicle 2. The charging coupling 1 preferably is within the body 10, offset by a spacing a relative to the body 10. The spacing "a" is measured from an end face 23 of the receiving device 3 to the body 10.

The charging coupling 1 has a locking device 11 with a drive device 12 and a locking section 13. The locking device 11 can be mounted on the receiving device 3 and functions to lock the charging plug 7 in the receiving section 4. The drive device 12 can have, for example, a pneumatic, hydraulic and/or electric actuator. Furthermore, the drive device 12 can have a gear mechanism that connects the locking section 13 to the actuator. The locking section 13 may be a locking bar and can be displaced by the drive device 12 into or out of the receiving section 4. To this end, the locking device 11 is actuated by a suitable control device to activate the drive device 12 for displacing the locking section 13. The locking section 13 is displaced approximately perpendicularly with respect to an introduction direction E of the charging plug 7 into the receiving section 4. In particular, the locking section 13 can be displaced into the receiving section 4 approximately perpendicular to a center axis 14 of said receiving section 4. The charging plug 7 has a mating locking section 15 configured to correspond to the locking section 13. The locking section 13 is displaced by the drive device 12 into the mating locking section 15 of the charging plug 7 to lock the charging plug 7 in the receiving section 4. The expression "approximately perpendicular" encompasses an angular range, for example 90°±10°, so that engagement of the locking section 13 in the mating locking section 15 locks the charging plug 7 reliably in the receiving section 4 against undesired removal.

The locking section 13 and/or the mating locking section 15 can have suitably configured bevels or chamfers to facilitate the displacement of the locking section 13 into the mating locking section 15. The mating locking section 15 and the locking section 13 are configured so that the locking section 13 can be displaced into the mating locking section 15 of the charging plug 7 only when the charging plug 7 is in the charging position in the receiving section 4. That is to say, locking of the charging plug 7 in the receiving section 4 is possible only when an electric contact is produced between charging plug 7 and the receiving device 3. The correct charging position of the charging plug 7 can be detected, for example, by a sensor system 32 on the end face 9. The sensor system 32 may comprise an infrared sensor, a microswitch, a proximity switch or the like. The locking device 11 is actuated so that the locking section 13 is displaced into the receiving section 4 only when the charging plug 7 is in the charging position. Furthermore, the locking section 13 can be pre-stressed by a spring against the charging plug 7 that is not yet in the charging position but already is in the receiving section 4 so that the locking section 13 snaps into the mating locking section 15 of the charging plug 7 as soon as the charging plug 7 is at the charging position.

The charging coupling 1 has a cover 16 for closing the receiving section 4 in a dust-tight and water-tight manner. The cover 16 is configured to be in the receiving section 4 of the receiving device 3 and has a plug-in section 17 of complementary configuration to the receiving section 4. The plug-in section 17 can be in the receiving section 4 of the receiving device 3 when the charging plug 7 is removed from the receiving section 4. The cover 16 has an outer end face 18 that is flush with the body 10 in a closure position (illustrated in FIG. 3) of the charging coupling 1. The plug-in section 17 of the cover 16 preferably has a mating locking section 20 configured to correspond to the locking section 13 of the locking device 11. The locking section 13 of the locking device 11 can be displaced into the mating locking section 20 of the cover 16 when the cover 16 is in the closure position. The locking device 11 functions to lock the charging plug 7 in the charging coupling 1 and to lock the cover 16 in the receiving device when the charging plug 7 is detached.

The cover 16 has a sealing device 21 to close the receiving section 4 in a dust-tight and water-tight manner. The sealing device 21 may be an annular seal that encloses the plug-in section 17, which can be cylindrical. An end face 22 of the sealing device 21 may be pressed against the end face 23 of the receiving device 3 in the closure position of the charging coupling 1. The locking section 13 engages the mating locking section 20 of the cover 16 in the closure position, and the sealing device 21 is loaded with a prestress in the introduction direction E so that the sealing device 21 reliably bears sealingly against the end face 23 of the receiving device 3. The cover 16 and the sealing device 21 preferably are formed in one piece. For example, the cover 16 can be formed from plastic material, the sealing device 21 can be an elastically deformable section of the cover 16. For example, the cover 16 is produced integrally with the sealing device 21 in a two-component plastic injection molding process. A charging coupling arrangement 24 of the motor vehicle 2 has the charging coupling 1, the cover 16 and the charging plug 7.

The locking section 13 holds the charging plug 7 in the receiving device 3 to ensure that the charging plug 7 cannot be detached incorrectly while charging the energy store of the motor vehicle 2. In addition, the cover 16 closes the receiving device 4 to the outside when the charging plug 7 is detached. The integration of the sealing device 21 and the cover 16 into one component and the use of the locking device 11 to lock both the charging plug 7 and the cover 16 reduces the weight and the number of components of the charging coupling 1.

The invention has been described using preferred embodiments, but is not restricted hereto, but can be modified in a wide variety of ways. Furthermore, it is to be noted that "a/one" does not rule out a plurality.

What is claimed is:

1. A charging coupling for a motor vehicle, comprising:
    a receiving device having at least one side wall formed with opposite first and second ends, an end wall extending from the first end of the at least one side wall to define a concave receiving section open at one end, and at least one lock opening formed in the at least one side wall between the first and second ends;
    a charging plug configured to be inserted into the receiving section, the charging plug having at least one side wall with at least one charging plug lock opening formed therein at a position corresponding to the at least one receiving device lock opening in the side wall when the charging plug is disposed in the receiving section;
    a cover having a plug in section configured to be inserted into the receiving section, at least one cover lock opening formed in the plug-in section at a position corresponding to the at least one receiving device lock opening when the plug-in section is disposed in the receiving section, at least one annular sealing device protruding from the cover and configured to contact the second end of the at least one side wall and seal the receiving section; and
    a locking device having a locking section, wherein
    the locking section is displaced into the receiving section lock opening and the charging plug lock opening approximately perpendicularly with respect to an introduction direction of the charging plug into the receiving section for locking the charging plug in a charging position in the receiving device when the charging plug is inserted into the receiving section, and
    the locking section is displaced into the cover lock opening approximately perpendicularly with respect to an introduction direction of the plug-in section into the receiving section for locking the cover in a sealing position when the plug-in is inserted into the receiving section.

2. The charging coupling of claim 1, wherein the receiving section is substantially cylindrical.

3. The charging coupling of claim 1, wherein the locking section is displaceable into the receiving section lock opening in a direction approximately perpendicular to a center axis of the receiving section.

4. The charging coupling of claim 1, wherein an end face of the charging plug and the end wall of the receiving section are in mutual contact when the charging plug is at the charging position.

5. The charging coupling of claim 1, wherein the cover and the sealing device are formed in one piece.

6. The charging coupling of claim 1, wherein the locking device has a drive device for displacing the locking section.

7. A charging coupling arrangement for a motor vehicle, comprising:
    the charging coupling of claim 1; and
    a charging plug configured at least in sections to correspond to the receiving device of the charging coupling.

8. A motor vehicle having the charging coupling of claim 1.

* * * * *